US010025766B2

(12) United States Patent
Maltz et al.

(10) Patent No.: US 10,025,766 B2
(45) Date of Patent: Jul. 17, 2018

(54) RELATIONAL DATABASE FOR ASSIGNING ORPHAN FILLABLE FIELDS OF ELECTRONIC FILLABLE FORMS WITH ASSOCIATED CAPTIONS

(71) Applicant: Xerox Corporation, Norwalk, CT (US)

(72) Inventors: Martin S. Maltz, Rochester, NY (US); Safwan R. Wshah, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 229 days.

(21) Appl. No.: 14/976,714

(22) Filed: Dec. 21, 2015

(65) Prior Publication Data

US 2017/0177557 A1 Jun. 22, 2017

(51) Int. Cl.
*G06F 17/24* (2006.01)
*G06K 9/00* (2006.01)

(52) U.S. Cl.
CPC ....... *G06F 17/243* (2013.01); *G06K 9/00449* (2013.01); *G06K 9/00469* (2013.01); *G06K 2209/01* (2013.01)

(58) Field of Classification Search
CPC ......... G06F 17/212; G06F 17/22; G06F 17/24
See application file for complete search history.

(56) References Cited

U.S. PATENT DOCUMENTS

| | | | |
|---|---|---|---|
| 5,748,809 A * | 5/1998 | Hirsch | G06K 9/00449 382/175 |
| 6,662,340 B2 * | 12/2003 | Rawat | G06F 17/243 705/34 |
| 7,509,346 B2 | 3/2009 | Mathew | |
| 8,233,714 B2 | 7/2012 | Zuev et al. | |
| 8,595,230 B1 | 11/2013 | Djabarov | |
| 8,706,762 B1 * | 4/2014 | Patzer | G06F 17/30867 707/687 |
| 8,825,592 B2 | 9/2014 | Lobo et al. | |
| 8,892,990 B2 | 11/2014 | Barrus | |
| 2012/0063684 A1 | 3/2012 | Denoue et al. | |
| 2012/0137207 A1 | 5/2012 | Heinz et al. | |
| 2015/0317296 A1 | 11/2015 | Vohra et al. | |
| 2016/0217119 A1 * | 7/2016 | Dakin | G06F 17/243 |

* cited by examiner

*Primary Examiner* — Scott Baderman
*Assistant Examiner* — Seung Jung
(74) *Attorney, Agent, or Firm* — Fox Rothschild LLP

(57) ABSTRACT

A system of associating text items with fillable fields of an electronic fillable form may identify an electronic fillable form comprising one or more fillable fields and one or more text items, and for one or more pairs of fillable fields and text items, determine a confidence value associated with the pair. The system may determine a first configuration for the electronic fillable form, determine an overall confidence value for the first configuration, and identify one or more orphan fields from the determined configuration. The system may determine a second configuration for the electronic form, determines an overall confidence value for the second configuration, and in response to the overall confidence value for the first configuration exceeding the overall confidence value for the second configuration, selects the first configuration, otherwise, selects the second configuration. The system creates an association map for the selected configuration.

13 Claims, 9 Drawing Sheets

FORM A

PLEASE SELECT ONE:

308  310  312  314  316

☐ INHERITED ☐ CAPITAL ☐ EARNED ☐ OTHER ☐
              GAINS

RELATIONAL DATABASE FOR ASSIGNING ORPHAN FILLABLE FIELDS OF ELECTRONIC FILLABLE FORMS WITH ASSOCIATED CAPTIONS

BACKGROUND

In order to create electronic representations of forms or other documents, it is often helpful to identify fillable fields and associated captions for such forms or documents. However, due to the layout or labeling of such a form or document, captions are frequently associated with the wrong fillable fields.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a system of associating text items with fillable fields of an electronic fillable form may include a processor, and a non-transitory computer-readable storage medium. The computer-readable storage medium may include instructions that are configured to cause the processor to identify an electronic fillable form comprising one or more fillable fields and one or more text items, and for one or more pairs of fillable fields and text items, determine a confidence value associated with the pair. The confidence value represents a likelihood that the text item corresponds to the fillable field. The system may determine a first configuration for the electronic fillable form by, for each field: identifying the pair to which the fillable field belongs having a highest confidence value, identifying the text item associated with the identified pair, and associating the fillable field with the identified text item. The system may determine an overall confidence value for the first configuration, and identify one or more orphan fields from the determined configuration. The system determines a second configuration for the electronic form by, for each identified orphan field, identifying the pair to which the identified orphan field belongs having a next highest confidence value, identifying the text item associated with the identified pair, and associating the identified orphan field with the identified text item. The system determines an overall confidence value for the second configuration, and in response to the overall confidence value for the first configuration exceeding the overall confidence value for the second configuration, selects the first configuration, otherwise, the system selects the second configuration. The system creates an association map for the selected configuration that includes an indication of each fillable field and associated identified text item, and stores the association map in association with the electronic fillable form.

Optionally, the system may determine a confidence value by determining a distance between the fillable field and the text item of the pair, and converting the distance into a confidence value.

The system may determine a distance between the field and the text item determining a shortest distance between the fillable field and the text item. Alternatively, the system may determine a distance between the field and the text item by identifying the fillable field as a grouping, and determining a distance between a top left portion of the grouping and the text item. The system may optionally, for one or more of the pairs, store an indication of one or more of the fillable field, the text item and the confidence value in a relational database.

The system may further include a scanner that is configured to scan a physical document to generate the electronic fillable form, and provide the electronic fillable form to the processor.

In an embodiment, the system may, for each new orphan field, identify the pair to which the identified orphan field belongs having a next highest confidence value, identify the text item associated with the identified pair, and associate the identified orphan field with the identified text item. The processor may apply the selected configuration to the electronic fillable form when the electronic fillable form is accessed.

BRIEF DESCRIPTION OF THE DRAWINGS

FIGS. 3A, 3B, 3C each illustrate example forms having fillable fields according to various embodiments.

DETAILED DESCRIPTION

The following terms shall have, for purposes of this application, the respective meanings set forth below:

A "caption" refers to a text string representing a title, description or explanation of one or more fillable fields.

A "computing device" or "electronic device" refers to a device that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players and the like.

A "fillable field" refers to a portion of an electronic document or file in which information or data may be entered, selected, added or modified. Examples of fillable fields include, without limitation, a check box, a text field, and/or the like.

A "fillable form" or an "electronic fillable form" refers to an electronic document or file having one or more fillable fields.

A "grouping" refers to content of a fillable form that is bounded by lines. In certain embodiments, the content may include fillable fields, text items and/or the like.

A "text item" refers to a string of alphanumeric characters, symbols or other text.

As the popularity of mobile electronic devices such as, for instance, mobile phones and tablets, increases, so does the number of fillable forms being completed using such devices. It is important that processing of a fillable form be performed correctly so that the appropriate captions are associated with the appropriate fillable fields of the fillable form.

Figure 1:
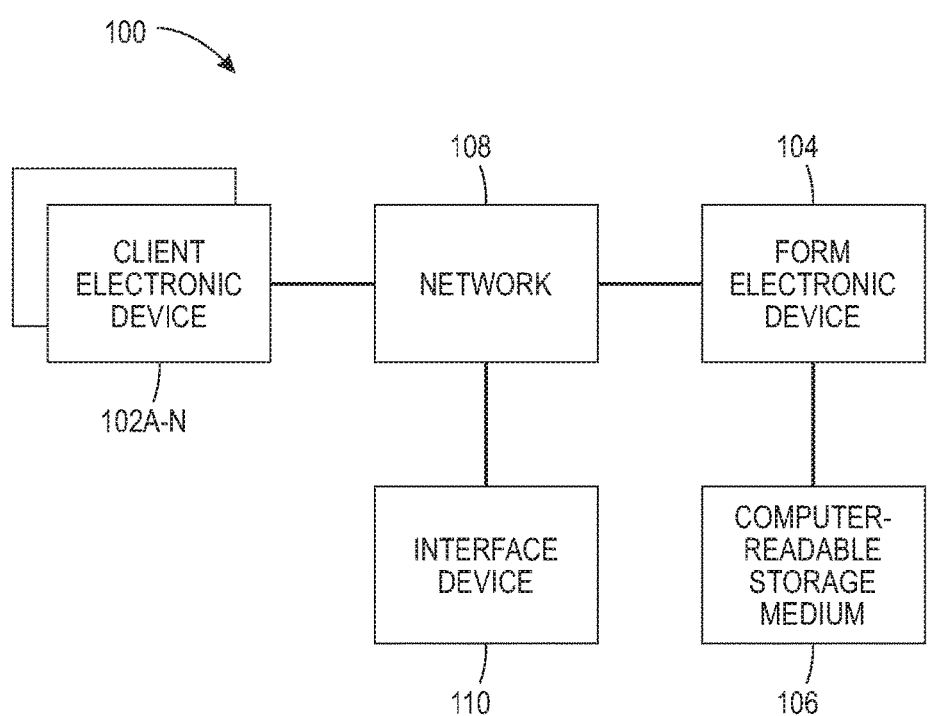
FIG. 1 illustrates an example system of assigning captions to fillable fields of a fillable form according to an embodiment.

FIG. 1 illustrates an example system of assigning captions to fillable fields of a fillable form according to an embodiment. As illustrated by FIG. 1, the system 100 may include one or more client electronic devices 102a-N, a form electronic device 104 and a computer-readable storage medium 106. One or more of the client electronic devices 102a-N may be in communication with the form electronic device 104 via a communication network 108. A communication network 108 may be a local area network (LAN), a wide area network (WAN), a mobile or cellular communication network, an extranet, an intranet, the Internet and/or the like. In various embodiments, a client electronic device 102a-N may be a mobile electronic device such as, for example, a smartphone, a tablet and/or the like.

In an embodiment, the system 100 may include an interface device 110 which is capable of converting physical documents into electronic data, or converting received data into electronic form. Examples of interface devices include, without limitation, a document scanner device, a multifunction device, an image capturing device, such as a camera or other image sensor, and/or the like. An interface device 110 may include an image sensor which may capture an image of at least a portion of one or more physical documents. Similarly, an electronic device such as, for example, a mobile electronic device may include a camera which may capture an image of at least a portion of one or more physical documents. An interface device 110 may be in communication with a form electronic device 104. For instance, an interface device 110 may capture an image of a physical document, and may convert the physical document into electronic data which it may provide to a form electronic device 104 such as, for example, by transmitting the electronic data to a form electronic device over a communication network 108.

Figure 2:
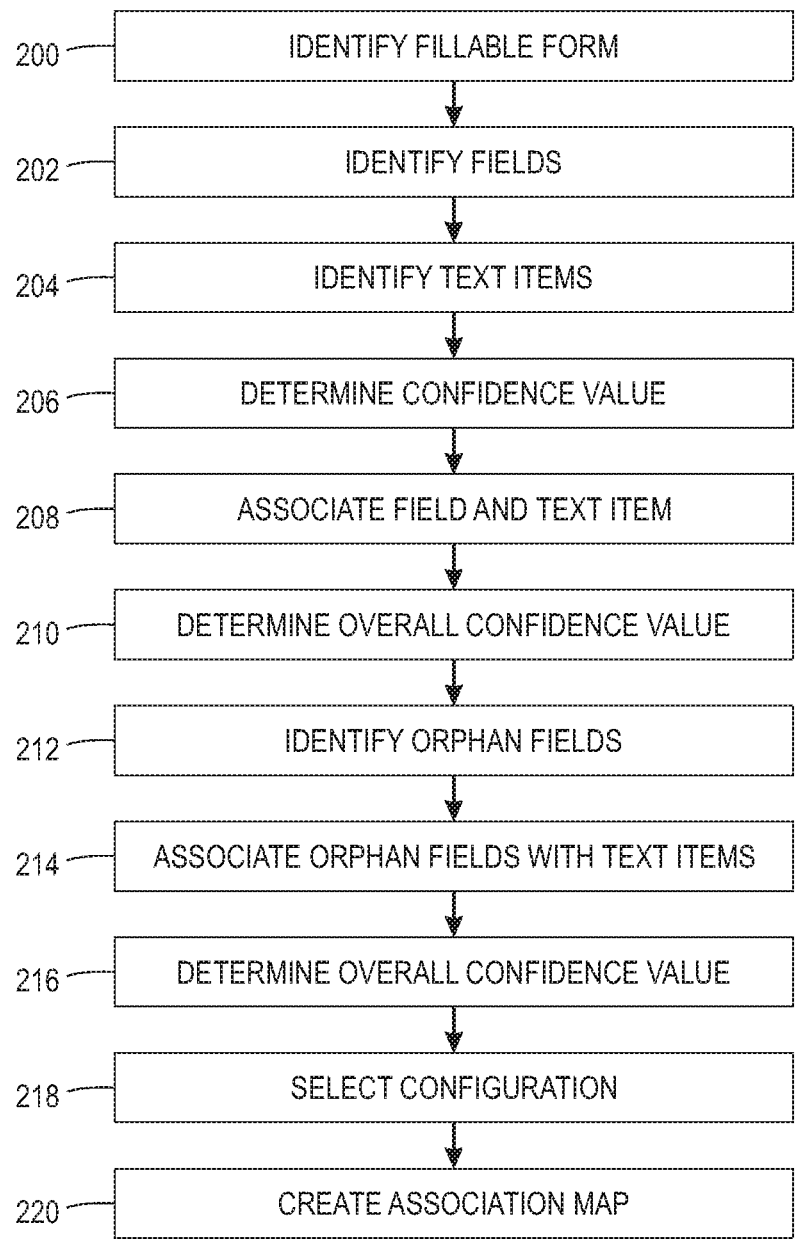
FIG. 2 illustrates a flow chart of an example method of assigning captions to fillable fields according to an embodiment.

FIG. 2 illustrates a flow chart of an example method of assigning captions to fillable fields according to an embodiment. As illustrated by FIG. 2, a processor may identify 200 a fillable form. A processor may identify 200 a fillable form by recognizing when a fillable form is opened or accessed by a user. For instance, a processor may recognize when a user accesses a fillable webpage, portable document format (PDF) document, and/or the like.

In another embodiment, a processor may identify a fillable form by converting data received from an interface device to data associated with a fillable form. For instance, a user may use an interface device, such as a scanner, to scan a physical document. The interface device may convert the physical document into an electronic document, and may transmit the electronic document to an electronic device, such as a form electronic device. The form electronic device may generate an editable or fillable version of the electronic document, such as a fillable form, which may be accessed or provided to one or more users.

In an embodiment, a processor may identify 202 one or more fillable fields or groupings of the fillable form. A processor may identify 202 a list of fillable fields by performing connected component analysis. Connected component analysis may identify one or more fillable fields of a fillable document.

A fillable field may be any portion of a form in which information may be selected, added, or modified. For example, a fillable field may be a check box, a free text field and/or the like. In certain embodiments, information may be entered into a fillable form using one or more input devices such as, for example, a finger or a stylus on a touch screen display. For instance, a processor may cause one or more fillable fields to be displayed to a user via a display device associated with a client electronic device. A user may enter, select and/or modify information of a fillable field by selecting the fillable field or an area in or around the fillable field. In the case of a touch screen display device, a user may use his or her finger to touch the fillable field or an area surrounding the fillable field.

When an electronic device outputs an electronic fillable form on its display device, the display may include one or more fillable fields that are bounded by boundaries, such that when an electronic device detects that a user has selected an area within the fillable field or within a threshold distance from the fillable field, the fillable field will activate by highlighting, displaying a cursor, or otherwise activating so that characters subsequently entered via input will enter into the fillable field. For example, if the display is a touch sensitive display, the display may include one or more areas that are bounded by boundaries such that when a sensor of the touch screen detects that a user has touched the screen within the boundary of a fillable field (or within a threshold distance of the fillable field), the fillable field will activate by highlighting, displaying a cursor, or otherwise activating so that content that is subsequently entered via the touch screen will be entered into the fillable field.

A user may enter, select and/or modify information of a fillable field by selecting the fillable field or an area in or around the fillable field. In the case of a touch screen display device, a user may use his or her finger to touch the fillable field or an area surrounding the fillable field. When a sensor of the display's touch-sensitive screen detects that a user has touched the screen within the fillable field or within a threshold distance of the fillable field, the fillable field may activate so that content, such as text, numbers or symbols, that are subsequently entered into the device will be added to the fillable field.

Figure 3A:
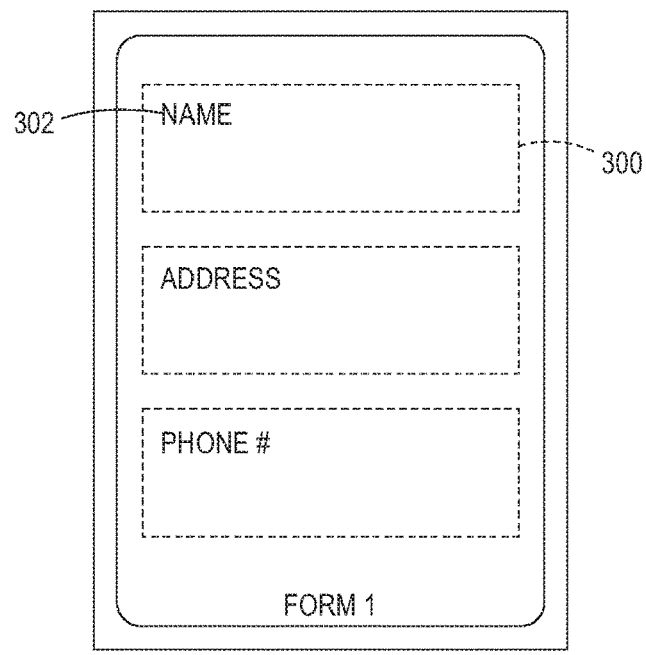
Figure 3B:
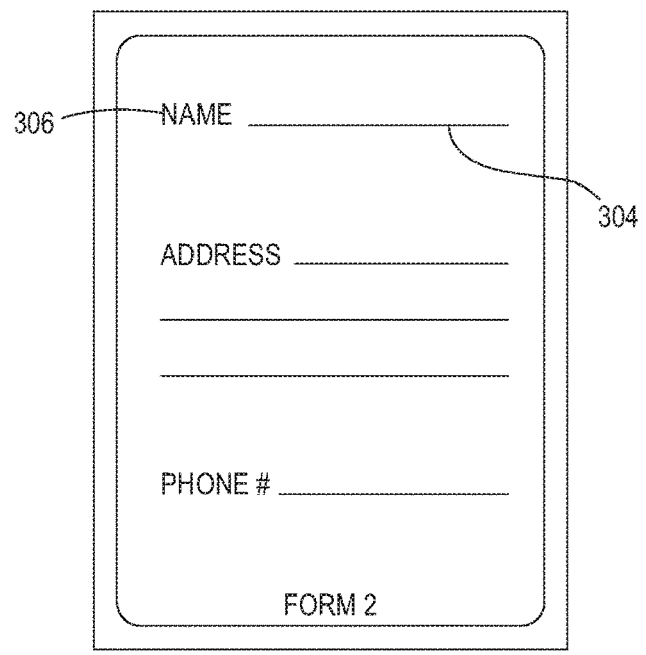

FIGS. 3A and 3B each illustrate example fillable fields of a form that is displayed on a touch screen of a mobile electronic device according to various embodiments. As illustrated by FIG. 3A, the box 300 surrounding the text "NAME" 302 may be considered a fillable field, while, as illustrated by FIG. 3B, the line 304 next to the text "NAME" 306 may be considered a fillable field.

FIG. 3C illustrates an example form displayed on a touch screen 322 of a mobile electronic device 320 according to an embodiment. As illustrated by FIG. 3C, each checkbox 308, 310, 312, 314 may be considered a fillable field, along with the text box 316. A user may make a selection by touching the screen in proximity to a fillable field.

A processor may identify 202 one or more groupings associated with a fillable form. A processor may identify 202 one or more groupings by using a line recognition algorithm to identify one or more regions of a fillable form that includes content, such as for example, fillable fields, text items and/or other content that is bounded by lines. FIG. 3C illustrates an example grouping 318 according to an embodiment.

In an embodiment, one or more fillable fields may be identified by coordinates, position, dimensions and/or the like. For example, a processor may store a coordinate pair (x, y value) and/or a delta x (Δx) and delta y (Δy) value for one or more fillable fields that can be used to identify the corresponding fillable field.

Referring back to FIG. 2, a processor may identify 204 one or more text items associated with a fillable form according to an embodiment. A processor may identify 204 one or more text items using one or more text recognition algorithms. For instance, a processor may perform connected component analysis to find objects of the general size and with characteristics of text items. These objects may be connected together to form lines and blocks of text.

In various embodiments, one or more text items may be identified 204 by coordinates, position, dimensions and/or the like. For example, a processor may store a coordinate pair (x, y value) and/or a delta x (Δx) and delta y (Δy) value for one or more text items that can be used to identify the corresponding text item.

A processor may determine 206 a confidence value for one or more pairs of identified fillable fields and text items. A confidence value may represent a measure of probability or likelihood that a particular text item is the caption associated with a particular fillable field. A confidence value may be indication of how close a text item is located to a fillable field, as text items that are located closer to a fillable field have a higher likelihood of being the caption for the particular fillable field.

A processor may determine 206 a confidence value by determining a displacement or distance between a fillable field and a text item. For instance, a processor may identify a position of an identified fillable field and a position of an identified text item, and may determine a distance between the position of the identified fillable field and the identified text item. In an embodiment, a distance between a text item and a fillable field may be a shortest distance between the fillable field and the text item. For instance, a fillable field may be a text box having a large Δx value and a small Δy value, such as that illustrated in FIG. 4. One or more text items may be positioned around the text box 400 such as, for example, to the left of the left-most edge 402 of the text box or to the right of the right-most edge 404. A distance between a text item and the text box may be determined as the shortest distance between the two. In other words, a distance between a text item and a fillable field need not be determined from a particular side, edge, or other location of the fillable field.

In various embodiments, a distance between a text item and a grouping may be a distance between a top portion of the grouping and the text item. For instance, for a grouping, a distance may be one between a top left position of the grouping and the text item.

As a confidence value may be a function of proximity between a text item and a fillable field, a processor may convert the determined distance to a confidence value that indicates a relative proximity between a text item and a fillable field. For instance, certain distances or ranges of distances may correspond to certain percentages or other values.

Table 1 illustrates example distances and corresponding confidence values according to an embodiment. As illustrated by Table 1, certain distance ranges may correspond to certain confidence values. For instance, a text item that is positioned less than 1 unit of distance from a fillable field may have a 99% confidence value of being the caption for the fillable field. Additional and/or alternate distances, distance ranges, and/or confidence values may be used within the scope of this disclosure.

TABLE 1

| Distance (unit) | Confidence Value (percentage) |
| --- | --- |
| <1 | 99% |
| 1-1.50 | 97% |
| 1.51-2 | 95% |
| 2.01-3 | 90% |
| 3.01-4 | 85% |
| 4+ | 80% |

In an embodiment, a processor may store an indication of confidence values associated with one or more text items, fillable fields and/or groupings. For example, a processor may store an indication of confidence values associated with one or more text items in a relational database.

In various embodiments, a processor may store one or more links between text items, fillable fields and/or groupings. A processor may store an indication of confidence values associated with one or more text items as part of the link. For instance, a processor may store one or more links in a relational database along with confidence values associated with the links. In certain embodiments, a processor may create a link between each possible combination of fillable field, grouping and text item. In other embodiments, a processor may only create links between fillable fields, groupings and text items that are in relative proximity to one another. For instance, if a text item is located more than a threshold distance away from a fillable field, a processor may not create a link for such a pairing as the likelihood that the text item corresponds to the fillable field is low.

Figures 4, 5:
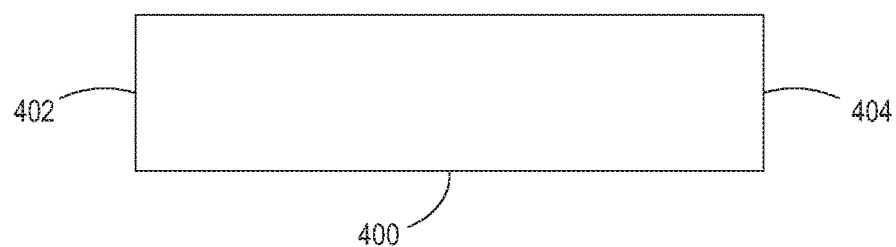
FIGS. 4 and 5 each illustrates example fillable fields according to various embodiments.

FIG. 5 illustrates fillable fields F1, F2, F3, F4, F5 and text items TI1, TI2, TI3, TI4. Table 2 illustrates example entries of an example relational database showing confidence values for each fillable field and text item pair illustrated in FIG. 5 according to an embodiment.

TABLE 2

| Fillable Field | Text Item | Confidence Value |
| --- | --- | --- |
| F1 | TI1 | 97% |
| F1 | TI2 | 90% |
| F1 | TI3 | 85% |
| F1 | TI4 | 80% |
| F2 | TI1 | 90% |
| F2 | TI2 | 95% |
| F2 | TI3 | 90% |
| F2 | TI4 | 85% |
| F3 | TI1 | 90% |
| F3 | TI2 | 97% |
| F3 | TI3 | 95% |
| F3 | TI4 | 90% |
| F4 | TI1 | 85% |
| F4 | TI2 | 90% |
| F4 | TI3 | 94% |
| F4 | TI4 | 95% |

TABLE 2-continued

| Fillable Field | Text Item | Confidence Value |
|---|---|---|
| F5 | TI1 | 80% |
| F5 | TI2 | 85% |
| F5 | TI3 | 90% |
| F5 | TI4 | 97% |

Figure 6A:
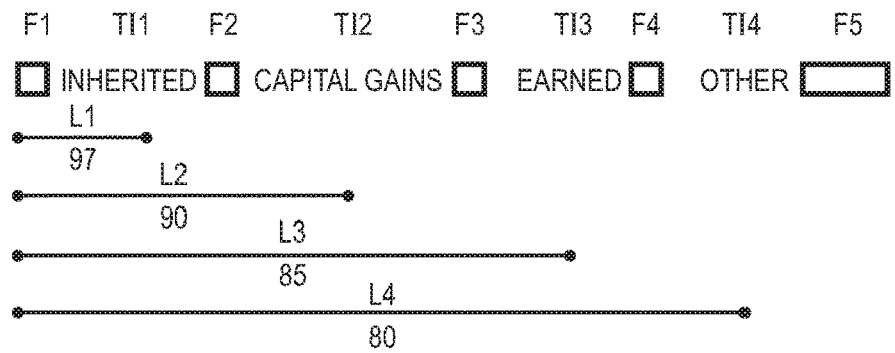
FIGS. 6A-6E illustrate example links between fillable fields and text items according to various embodiments.
Figure 6B:
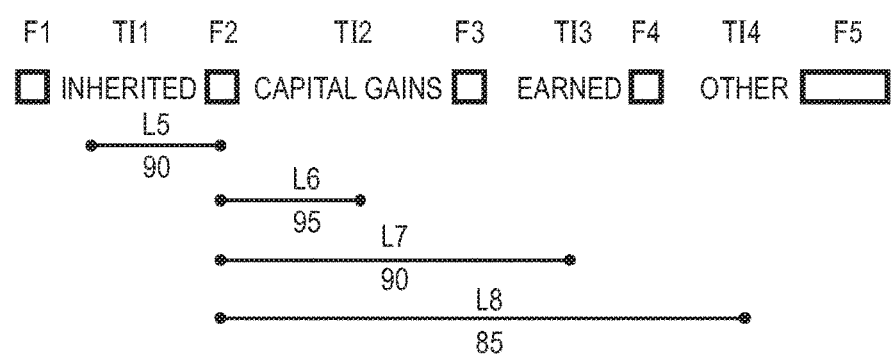
Figure 6C:
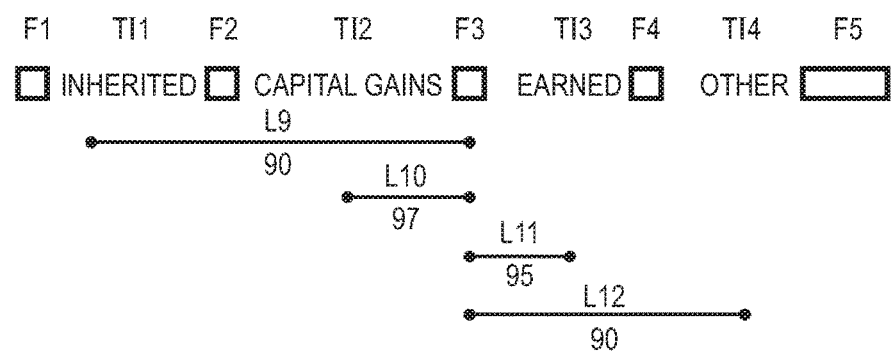
Figure 6D:
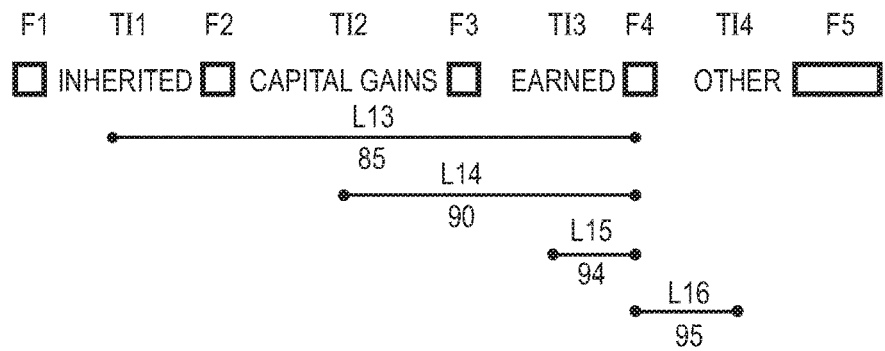
Figure 6E:
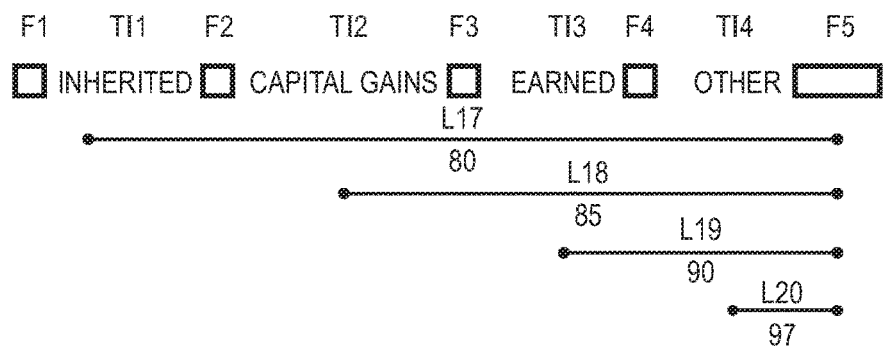

FIGS. 6A-6E illustrate example links between text items and fillable fields, along with the confidence values associated with each link. For example, FIG. 6A shows that link L1 between fillable field F1 and text item TI1 has a confidence of 97%.

Figure 7:
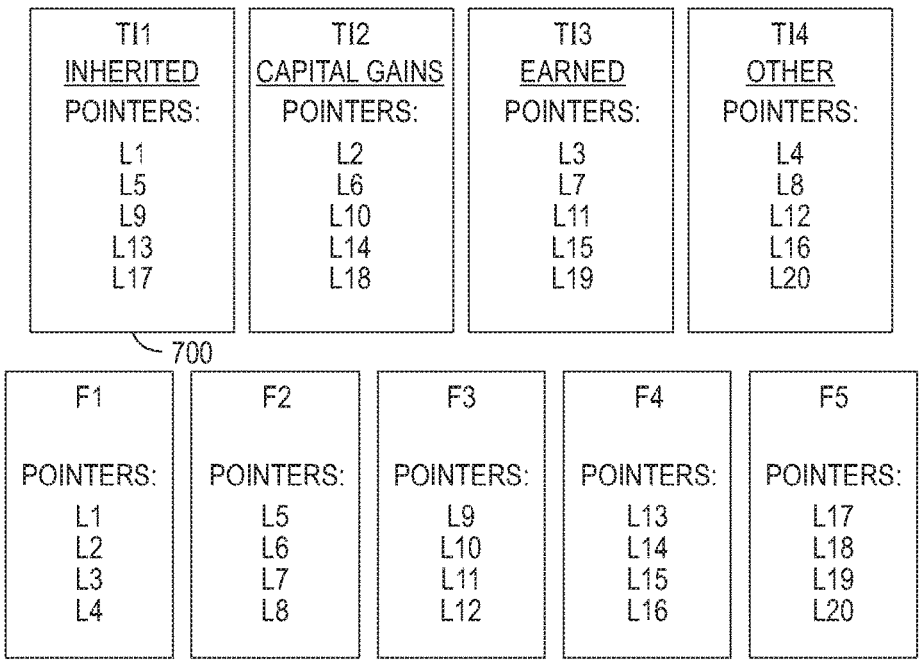
FIG. 7 illustrates example pointer lists according to an embodiment.

In certain embodiments, a processor may maintain a pointer list for one or more text items. The pointer list for a text item may include pointers to all links that connect to the text item. Similarly, a processor may maintain a pointer list for one or more fillable fields or groupings that includes pointers to all links that connect to the fillable fields or groupings. FIG. 7 illustrates example pointer lists for the text items and fillable fields illustrated in FIG. 5 according to an embodiment. For instance, the pointer list 700 for TI1 includes pointers to links L1, L5, L9, L13 and L17.

Referring back to FIG. 2, in an embodiment, the processor may associate 208 a fillable field and a text item having the highest confidence value for the fillable field. In another embodiment, a processor may associate a fillable field and a text item having the highest confidence value for the fillable field that exceeds a threshold value. For instance, a text item and fillable field may only be associated if their confidence value exceeds a certain threshold. If this is not the case, a fillable field may not be associated with a text item.

Figure 8:
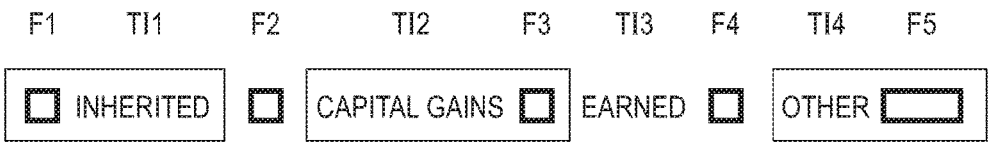
FIGS. 8 and 9 illustrate associations between fillable fields and text items according to various embodiments.

For instance, FIG. 8 illustrates example associations of the text items and fields illustrated in FIG. 5. Referring to Table 2, and assuming a confidence value threshold of 96%, a processor may associate text item TI1 with fillable field F1 because the confidence value between TI1 and F1 is higher than the confidence value between F1 and any other text item, and because the confidence value between TI1 and F1 exceeds the threshold value of 96%.

In comparison, fillable field F2 may not be associated with a text item because no confidence value between F2 and any possible text items exceeds 96%. As FIG. 8 shows, the association process may sometimes leave orphan fillable fields because another fillable field has captured the text item near the orphan fillable field because it was located even closer. For instance, fillable field F2 and fillable field F4 may be considered orphan fillable fields as they are not associated with a text item.

In an embodiment, a processor may store a determined configuration. For instance, a processor may store a configuration in a database or other location such that it is associated with the fillable form to which it corresponds.

Referring back to FIG. 2, a processor may determine 210 an overall confidence value for the determined association configuration. An overall confidence value for a configuration may be determined 210 by computing an average of the confidence values of the configuration. For instance, an overall confidence value for the configuration illustrated by FIG. 8 may be determined by summing the confidence values of each associated fillable field (i.e., 97%+97%+97%), and dividing the sum by the total number of fillable fields (i.e., 5) to result in a value of 58%. In other embodiments, a processor may determine 210 an overall confidence value for a determined association configuration by summing the applicable confidence values.

Referring back to FIG. 2, a processor may identify 212 one or more orphan fillable fields. For example, referring to FIG. 8, a processor may identify F2 and F4 as orphaned fillable fields. For each of the identified orphaned fillable fields, the processor may associate 214 the orphaned fillable field with a text item having a second highest confidence value. In certain embodiments, a processor may associate 214 an orphaned fillable field with a text item having a second highest confidence value even if the confidence value is less than an associated threshold value. For instance, with respect to fillable field F2, a processor may associate F2 with TI2 even though the confidence value associated with this pair is 95% and is less than the threshold value of 96% and the highest confidence value associated with the TI2 (i.e., the link between F3 and TI2 which has a 97% confidence value).

Figures 9, 10:
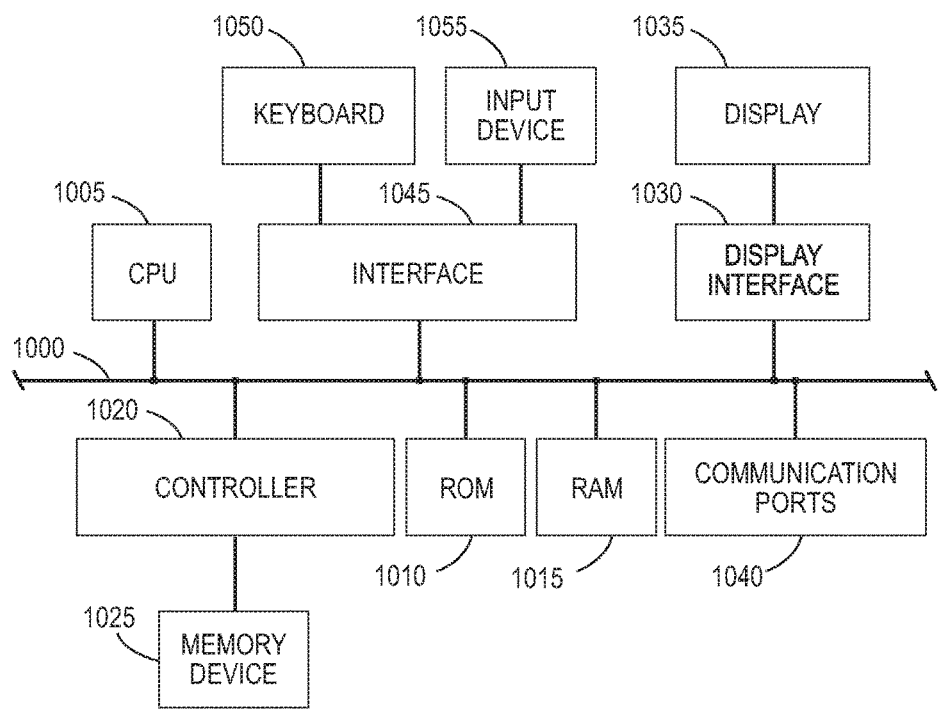
FIG. 10 illustrates a block diagram of example hardware that may be used to contain or implement program instructions according to an embodiment.

The processor may continue to identify 212 orphan fillable fields, and associate 214 the identified orphan fillable fields with text items until each orphan fillable field is associated with a text item, and a new configuration is created. In certain embodiments, this process may result in previously associated fillable fields becoming orphan fillable fields. In this situation, the process may be iterated until no orphan fillable fields exist. In other embodiments, the process may result in all fillable fields being associated with at least one text item. FIG. 9 illustrates example associations that may result from identifying 212 and associating orphan fillable fields 214 illustrated in FIG. 8 according to an embodiment.

In various embodiments, a processor may store a new configuration. For instance, a processor may store a new configuration in a database or other location such that it is associated with the fillable form to which it corresponds and/or to a previously determined configuration for the fillable form.

In an embodiment, a processor may determine 216 an overall confidence value for the new configuration in a manner similar to that described above. For instance, a process may determine that the configuration illustrated in FIG. 9 has an overall confidence value of 95.8% (e.g., (97%+95%+95%+95%+97%)/5).

A processor may select 218 a configuration. For example, a processor may compare the overall confidence values of an original configuration and a new configuration, and select 218 the configuration associated with the highest overall confidence value. For example, a processor may select 218 the example new configuration since its overall confidence value of 95.8% exceeds the 58% confidence value associated with the original configuration.

Although the disclosure describes only one iteration of orphan fillable field analysis, it is understood that the described approach may be performed additional times. For instance, orphan fillable field analysis may be performed on a new configuration to determine whether a configuration having an even higher overall confidence value exists.

In an embodiment, a processor may create 220 an association map for the fillable form. A processor may create 220 an association map by creating an electronic file that includes an indication of which fillable fields are associated with which text items. A processor may store an association map in a table, a list, a database or other similar data structure such that the association map is associated with the particular fillable form to which it pertains.

In various embodiments, an electronic device may automatically apply a stored association map for a fillable form when the form is opened, viewed or otherwise accessed. Applying an association map may involve accessing or utilizing at least a portion of an association map. For instance, a processor may access an association map when it receives a selection of a portion of a fillable form. A processor may use an association map to determine where to position a cursor or other input indication or other input, editing or display decisions. For instance, a processor may receive a selection of a portion of a fillable form, such as, coordinates associated with a mouse click or other selection method. The processor may determine that the selection is of a text item of the fillable form, and may use an association map to determine to which fillable field the text item corresponds. The processor may then cause an input indicator, such as a cursor, to be displayed in the fillable field associated with the selected text item.

FIG. 10 depicts a block diagram of hardware that may be used to contain or implement program instructions. A bus 1000 serves as the main information highway interconnecting the other illustrated components of the hardware. CPU 1005 is the central processing unit of the system, performing calculations and logic operations required to execute a program. CPU 1005, alone or in conjunction with one or more of the other elements disclosed in FIG. 10, is an example of a production device, computing device or processor as such terms are used within this disclosure. Read only memory (ROM) 1010 and random access memory (RAM) 1015 constitute examples of non-transitory computer-readable storage media.

A controller 1020 interfaces with one or more optional non-transitory computer-readable storage media 1025 to the system bus 1000. These storage media 1025 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 1010 and/or the RAM 1015. Optionally, the program instructions may be stored on a tangible, non-transitory computer-readable medium such as a compact disk, a digital disk, flash memory, a memory card, a USB drive, an optical disc storage medium and/or other recording medium.

An optional display interface 1030 may permit information from the bus 1000 to be displayed on the display 1035 in audio, visual, graphic or alphanumeric format. Communication with external devices, such as a printing device, may occur using various communication ports 1040. A communication port 1040 may be attached to a communications network, such as the Internet or an intranet.

The hardware may also include an interface 1045 which allows for receipt of data from input devices such as a keyboard 1050 or other input device 1055 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A system of associating text items with fillable fields of an electronic fillable form, the system comprising:
   a processor; and
   a non-transitory computer-readable storage medium comprising one or more instructions that are configured to cause the processor to:
      identify an electronic fillable form comprising one or more fillable fields and a plurality of text items,
      determine a confidence value for each of a plurality of pairs of the one or more fillable fields and the plurality of text items, wherein the confidence value represents a likelihood that the text item of the pair corresponds to the fillable field of the pair,
      determine a first configuration for the electronic fillable form by, for each fillable field:
         identifying a pair from the plurality of pairs to which the fillable field belongs having a highest confidence value,
         identifying the text item associated with the identified pair, and
         associating the fillable field with the identified text item,
      determine an overall confidence value for the first configuration,
      identify one or more orphan fields from the first configuration,
      determine a second configuration for the electronic form by, for each identified orphan field:
         identifying a second pair from the plurality of pairs to which the identified orphan field belongs having a next highest confidence value,
         identifying the text item associated with the identified second pair, and
         associating the identified orphan field with the identified text item associated with the identified second pair,
      determine an overall confidence value for the second configuration,
      in response to the overall confidence value for the first configuration exceeding the overall confidence value for the second configuration, select the first configuration, otherwise, select the second configuration,
      create an association map for the selected configuration comprising an indication of each fillable field and associated identified text item, and
      store the association map in association with the electronic fillable form.

2. The system of claim 1, wherein the instructions that are configured to cause the processor to determine a confidence value, comprise instructions that are configured to cause the processor to:
   determine a distance between the fillable field of the pair and the text item of the pair; and
   convert the distance into the confidence value.

3. The system of claim 2, wherein the instructions that are configured to cause the processor to determine a distance between the field and the text item comprise instructions that are configured to cause the processor to determine a shortest distance between the fillable field and the text item.

4. The system of claim 2, wherein the instructions that are configured to cause the processor to determine a distance between the field and the text item comprise instructions that are configured to cause the processor to:
   identify the fillable field as a grouping; and
   determine a distance between a top left portion of the grouping and the text item.

5. The system of claim 1, wherein the non-transitory computer-readable storage medium further comprises one or more instructions that are configured to cause the processor to, for one or more of the pairs, store an indication of one or more of the fillable field, the text item and the confidence value in a relational database.

6. The system of claim 1, further comprising a scanner, wherein the scanner is configured to:
scan a physical document to generate the electronic fillable form; and
provide the electronic fillable form to the processor.

7. The system of claim of claim 1, wherein the non-transitory computer-readable storage medium further comprises one or more instructions that are configured to cause the processor to apply the selected configuration to the electronic fillable form when the electronic fillable form is accessed.

8. A method of associating text items with fields of an electronic fillable form, the method comprising:
identifying an electronic fillable form comprising one or more fillable fields and a plurality of text items;
determining a confidence value for each of a plurality of pairs of the one or more fillable fields and the plurality of text items, wherein the confidence value represents a likelihood that the text item of the pair corresponds to the fillable field of the pair;
determining a first configuration for the electronic fillable form by, for each fillable field:
identifying a pair from the plurality of pairs to which the fillable field belongs having a highest confidence value,
identifying the text item associated with the identified pair, and
associating the fillable field with the identified text item,
determining an overall confidence value for the first configuration;
identifying one or more orphan fields from the first configuration;
determining a second configuration for the electronic form by, for each identified orphan field:
identifying a second pair from the plurality of pairs to which the identified orphan field belongs having a next highest confidence value,
identifying the text item associated with the identified second pair, and
associating the identified orphan field with the identified text item associated with the identified second pair;
determining an overall confidence value for the second configuration;
in response to the overall confidence value for the first configuration exceeding the overall confidence value for the second configuration, select the first configuration, otherwise, select the second configuration;
creating an association map for the selected configuration comprising an indication of each field and associated identified text item; and
storing the association map in association with the electronic fillable form.

9. The method of claim 8, wherein determining a confidence value comprises:
determining a distance between the fillable field of the pair and the text item of the pair; and
converting the distance into the confidence value.

10. The method of claim 9, wherein determining a distance between the field and the text item comprises determining a shortest distance between the fillable field and the text item.

11. The method of claim 9, wherein determining a distance between the field and the text item comprises:
identifying the fillable field as a grouping; and
determining a distance between a top left portion of the grouping and the text item.

12. The method of claim 8, wherein further comprising, for one or more of the pairs, storing an indication of one or more of the fillable field, the text item and the confidence value in a relational database.

13. The method of claim of claim 8, further comprising applying the selected configuration to the electronic fillable form when the electronic fillable form is accessed.

* * * * *